United States Patent [19]
Grewer et al.

[11] 3,831,787
[45] Aug. 27, 1974

[54] DISCHARGE DEVICE FOR DIRECT-REDUCTION SHAFT FURNACE

[75] Inventors: Rudolf Grewer; Herbert Hickmann, both of Oberhausen; Hermann Trecker, Hunxe, all of Germany

[73] Assignee: Thyssen Niederrhein AG, Hutten- & Walzwerke, Oberhausen, Germany

[22] Filed: Feb. 20, 1973

[21] Appl. No.: 333,743

[30] Foreign Application Priority Data
Feb. 24, 1972  Germany........................... 2208775

[52] U.S. Cl................... 214/23, 198/67, 198/222, 214/17 D
[51] Int. Cl............................................. F27b 9/22
[58] Field of Search............ 214/18 R, 18 V, 23, 24, 214/17 B, 17 D; 222/409; 266/27; 198/67, 222, 224

[56] References Cited
UNITED STATES PATENTS

| | | |
|---|---|---|
| 1,211,743 | 1/1917 | Newlon............................ 214/17 B |
| 2,148,946 | 2/1939 | Hubmann et al................. 214/17 D |
| 2,276,950 | 3/1942 | Faller............................... 214/17 B |
| 3,369,411 | 2/1968 | Hines................................ 74/18.2 |
| 3,472,422 | 10/1969 | Ruiz............................... 222/409 X |

*Primary Examiner*—Robert G. Sheridan
*Attorney, Agent, or Firm*—Karl F. Ross; Herbert Dubno

[57] ABSTRACT

A discharge device for a direct-reduction shaft furnace, e.g. of the type used to produce sponge iron from iron ore, comprises a discharge or scraper bar or plate reciprocable beneath the column of charge in the furnace to displace the sponge iron alternately toward one side and the other and thus into respective outlets. The discharge bar or plate is provided with a pair of rods on each side, the rods extending in the direction of displacement. Floating bearings sealingly engage each rod and are connected to the housing. The floating bearings are provided with gas-type seals, motion-compensating members between the seals and the housing, and means limiting the displacement of the seal or packing structure.

6 Claims, 4 Drawing Figures

DISCHARGE DEVICE FOR DIRECT-REDUCTION SHAFT FURNACE

FIELD OF THE INVENTION

The present invention relates to a system for the discharging of solid materials from a column thereof and, more particularly, to an apparatus for discharging a shaft-type furnace e.g. for the direct reduction of iron ore.

BACKGROUND OF THE INVENTION

In many cases in the handling of solid material, especially for the treatment of solids with gases or the direct contact of a gas with a solid (e.g. so-called gas/solid contacting), it is necessary to remove the solid mass progressively at the base of the column. This is the case where the column is a furnace charge and the apparatus is, for example, a shaft furnace for the direct reduction of iron ore to sponge iron.

Unlike metallurgical systems in which ore and ore concentrates are reduced and the elemental metal is melted to produce a molten mass adapted to be collected and to be led away in a liquid form, direct-reduction furnaces for converting iron ore and ore concentrates to sponge iron make use of a column of a charge consisting of pellets or briquettes of the iron ore, and a reducing gas consisting at least in part of hydrogen and carbon monoxide which respectively react with the oxides of the charge to produce carbon dioxide and water vapor, the residue within the furnace being a highly reactive sponge elemental iron mass, hereinafter referred to as sponge iron.

Since the gas at the base of the column is unsmelted and in a spongy-solid form, it often is not loose or granular so that simple bulk-discharge methods for removing the finished product at the base of the furnace cannot be used. In other words, the weight of the column of charge upon the sponge iron at the base of the column prevents handling this material as a loose or noncoherent substance and hence special methods have been proposed for dislodging the sponge iron at the base of a shaft-type furnace.

These metals generally comprise the use of a conveyor structure to shift the charge or a portion thereof at the bottom of a shaft-type furnace to one side, to the opposite side or alternately to one side and the other, thereby depositing the charge in an outlet from which the charge can be metered to a further installation for processing the sponge iron, to a storage vessel or receptacle or to a transport vessel or receptacle, depending upon the ultimate use of the sponge iron.

In one system for dislodging the charge from the base of the column, a scraper or striker plate or bar is linearly reciprocable in a horizontal plane along a discharge table upon which the charge is supported to displace a portion of this charge first in one direction toward one outlet and then in the opposite direction toward another outlet, the reciprocation of the discharge bar or plate being accomplished by fluid-responsive cylinders attached to the plate by a rod or rods.

Such systems have been found to have problems which are associated with the rigorous conditions under which the discharge devices are used. For example, the temperatures sustained at the base of a shaft furnace for the direct reduction of iron ore to sponge iron, are substantial and the discharge device must be capable of withstanding these temperatures without distortion, disruption or dislocation of relatively moving parts. Furthermore, where the parts are composed of metal, they must be capable of undergoing bending or the like because of temperature differentials without disrupting operation. Furthermore, the relative movement must be permitted without significant release of gas from the interior to the exterior and without release of dust or like contaminant particles into the environment.

In prior-art systems for the discharge of shaft-type furnaces along the lines set forth above, all of the aforementioned requisites were satisfying only to a limited extent and, in general, performance was unsatisfactory.

OBJECTS OF THE INVENTION

It is the principal object of the present invention to provide an improved discharge device or apparatus for a column of solid charge whereby the aforementioned disadvantages are obviated.

It is another object of the invention to provide an improved device for the discharge of sponge iron from a direct-reduction furnace of the shaft type, in which the sponge iron is produced directly from iron ore, whereby the furnace can be operated with a minimum of release of dust and gases into the environment.

Still another object of the invention is to provide a dust-free discharge device for removing sponge iron from a direct-reduction shaft furnace whereby the disadvantages of earlier systems are eliminated.

SUMMARY OF THE INVENTION

These objects and others which will become apparent hereinafter are attained, in accordance with the present invention, in a discharge device or a sponge-iron column in a shaft furnace for the direct reduction of iron ore to sponge iron, i.e. for carrying out a direct reaction between a reducing gas and a solid charge of iron ore, in which a support table or plate (discharge plate) is provided at the base of the charge column and supports the latter, and a scraper or striker bar or plate is provided on top of this table and is reciprocable alternately to one side and the other of the charge column below the latter, thereby shifting a portion of the charge resting upon the table alternately to one side and to the other and into respective outlets on opposite sides of the column of charge.

According to the present invention, this striker plate is provided with at least one tension rod extending in each direction of reciprocation and connected to a fluid-responsive or other drive means such that the striker plate is displaced by the application of traction to the tension rods.

According to an essential feature of the present invention, the tension rods are each received slidably in a floating packing body which seals the tension rod against entrainment of dust into the surrounding atmosphere, the packing body or sleeve being connected to the furnace housing by compensating means allowing relative movement of the packing body with respect to the housing. Thus it s essential to the present invention that the packing body which seals the periphery of each rod against leakage of dust from the furnace around the rod, be so mounted on the housing or furnace support structure as to be capable of practically free movement at least in a vertical plane of the rod and with the latter.

According to another feature of the invention, the gas-tight packing is received within a packing housing which is connected to the furnace housing floatingly in the manner described above by compensating means which allows the relative movement, while means is provided to limit this movement, i.e., to permit the relative movement of the packing housing and the furnace housing only within certain limits.

In the discharge device of the present invention it is preferred to simultaneously mount the tension rods elastically and to provide for each pair of tension rods on one side of the striker plate, a crossbar or traverse and a common fluid-responsive device, such as a piston-and-cylinder arrangement for actuation of the rods. The traverse is provided with at least one pair of rollers, spaced apart horizontally in a direction perpendicular to the rods, which ride upon horizontal support surfaces. The compensating means according to the present invention preferably includes a tube extending from the housing into a bellows portion of the movable packing body, the space between the bellows and this tube being filled at least in part with a resilient heat-resistant thermal insulation.

The system described above has the disadvantage that it permits a completely dust-free operation of the device to be obtained with little wear of the moving parts and at the same time prevents transverse wear at the packing body so that the latter is subjected only to stress in the longitudinal direction in which the rods are displaceable. The useful life of the system is thereby increased, especially when the rods are employed as ducts for introduction of fluid to or removal of fluid from the striker plate as part of a cooling system.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
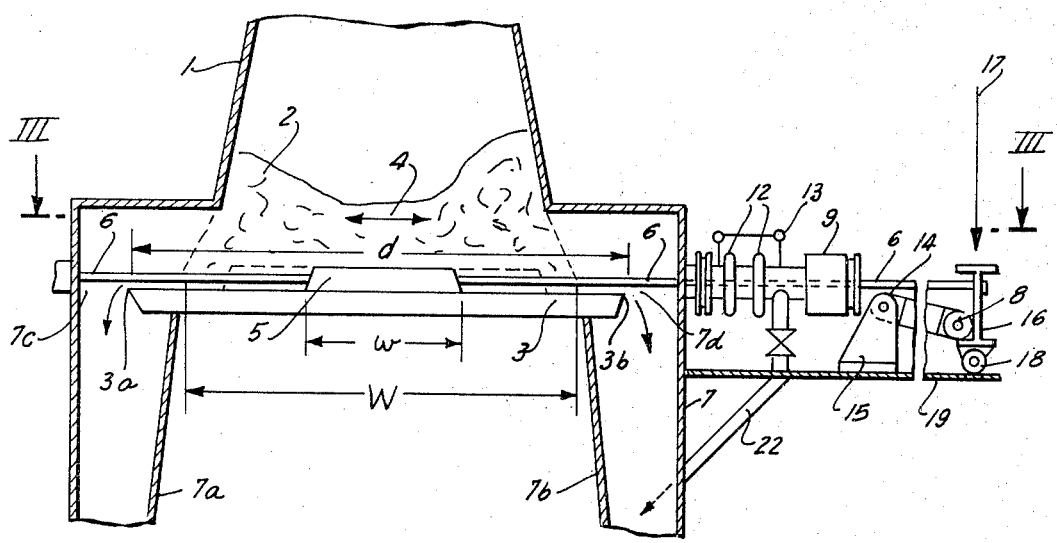
FIG. 1 is a vertical cross-sectional view, partly in diagrammatic form, through a discharge device of a shaft-type furnace according to the present invention.

In the drawing, there is shown a shaft-type furnace for the direct reduction of a column of iron ore 2, the furnace 1 being illustrated in diagrammatic form. It should be understood that a shaft-type furnace in accordance with the present invention will generally comprise, above the base of the furnace at which a discharge device is provided, means for introducing a heated reducing gas, e.g. a gas mixture containing hydrogen and carbon monoxide, means for recovering at the top of the shaft furnace a depleted gas which may be processed to recover waste heat and residual combustibles of a gas in the generation of the reducing gas, and means for feeding the iron ore to the top of the shaft furnace for reduction therein.

The last mentioned means may include a conveyor or the like for carrying iron-ore pellets or briquettes, with or without firing, to the top of the furnace, and a closure for gradually permitting these agglomerates of iron ore to enter the furnace without substantial freefall. The last mentioned means may include sealing bells or the like to prevent the escape of gas during corrugation of the charge in the furnace and means designed to distribute the addition to the charge substantially uniformly. As the reducing gases pass upwardly through the furnace iron oxides are converted to metallic iron and carbon monoxide and hydrogen are transformed into carbon dioxide and water vapor, the reaction taking place at a temperature below the melting point of metallic iron so that the product is a spongy, porous and highly reactive mass of metallic iron. This product is known in the art and is referred to hereinafter as sponge iron. The shaft-type furnace may widen downwardly toward its base to facilitate the downward movement of the column of charge therein, the column of charge being carried upon a discharge table and being discharged from the bottom via the means described above, illustrated in the drawing, and discussed in greater detail hereinbelow.

The discharge device according to the present invention comprises a discharge table 3 lying horizontally below the base of the column 2 of sponge iron in the shaft furnace 1 and supporting this column of charge. Upon the table 3 there is provided a discharge plate 5 whose width $w$ is less than the width $W$ of the charge column upon the plate and is displaceable alternately in opposite directions as represented by the arrow 4 over a stroke $d/2$ where $d$ is the width of the table and $d/3$ is approximately equal to $w$.

From both sides of the discharge plate 5, a pair of tension rods 6 extend, these rods pass out of the housing 7 and being provided with actuating systems as shown generally at 8 for the right hand rods of FIG. 1. A similar actuating system is provided at the left hand side of the device.

The housing 7 comprises a pair of chutes 7a and 7b, leading downwardly from the openings 7c and 7d at the end of the table 3. In operation, the plate 5 entrains a portion of sponge iron at the bottom of the charge to the left upon movement in this direction and carries this portion of the charge to the edge 3a of the table 3, the charge cascading over this edge through the opening 7c and being lead via chute 7a into a storage or transport vessel. The bottom of chute 7a may be closed by a flap structure.

During the movement of the plate 5 to the left, the charge 2 descends via an increment corresponding to the quantity of sponge iron discharged, to fill the space previously occupied by the plate 5. When the latter is then drawn to the right, a fresh increment of the sponge iron is entrained over the edge 3b of table 3 and into the chute 7b through opening 7d. With each reciprocation of the plate 5, therefore, a corresponding quantity of sponge iron is entrained out of the column 2 and caused to discharge through a respective chute.

The tension rods 6 pass slidably through floating packing sleeves or housings 9 which are provided with packing rings 10 hugging the rod 6 to form a gas-tight seal therewith. At the axial end of the packing sleeve turned toward the housing 7, each packing means includes a dust-stripper ring 11 which prevents entry of dust into the packing housing and hence prevents the dust from being entrained on the surface of a rod 6 out of the housing. The packing rings 10 are maintained in tight-fitting by slidable engagement with the rod 6 and are under pressure applied from a packing compression boss 10a of a rigid flanged sleeve 10b whose flange 10c is bolted to the packing housing 9 as best seen in FIG. 7 via a compensating system 12 and a yield limiter 13 as will be more readily apparent hereinafter.

Figure 2:
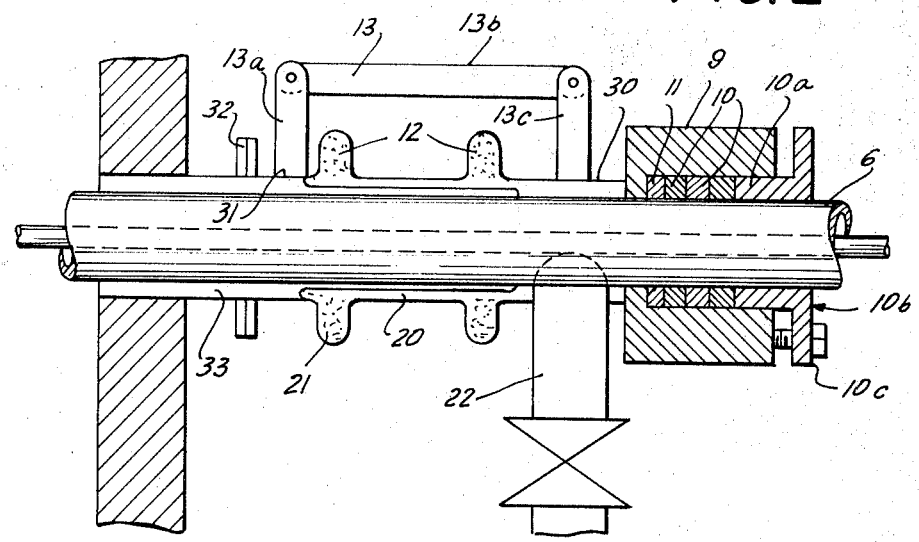
FIG. 2 is a detail view of the region II thereof.
Figure 4:
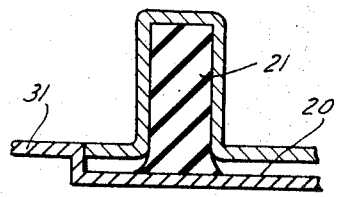
FIG. 4 is another detail view of the compensating structure.

The housing 9 may be rigid with a tube 30 which is formed with a plurality of corrugations defining an axially extensible and contractable bellows 12, the bellows 12 being formed with yieldable heat resistant fillers 21 which closely surround the inwardly extending neck 20 of a tube 31 flanged at 32 to a pipe 33 rigid with the housing wall 7. The movement-limiting device 13 includes a bar 13a rigid with pipe 31a and a further link 13c articulated to line 13b and connected to pipe 30. It should be apparent from FIGS. 2 and 4, that at least limited movement of pipe 30 and housing 9 is possible in the plane of the linkage 13 and of the rod 6 which may be provided with a duct leading a cooling fluid to or removing it from the plate 5 as described previously.

Figure 3:
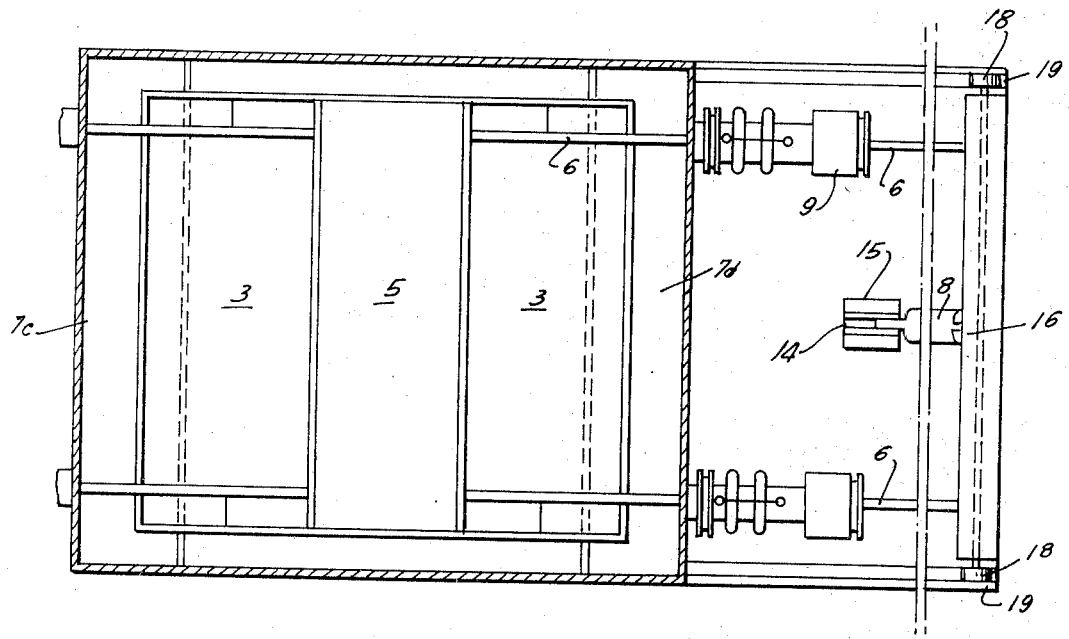
FIG. 3 is a view taken along the line III — III of FIG. 1.

The drive or actuating means for the plate 5 according to the present invention, comprises a piston-and-cylinder arrangement 8 (FIGS. 1 and 3) which is pivotally mounted at one end 14 on a pair of trunions 15 and, at the other end is pivotally connected to a transverse bar 16. The latter is fixed to the free ends of the two rods 6 at each side of the plate 5 and is provided with a pair of rollers 18 resting upon horizontal guide surfaces 19 formed by a pair of rails rigid with the housing as shown in FIGS. 1 and 3.

The pivots of the piston-and-cylinder arrangements are so positioned that a downward component 17 of force is applied by the piston-and-cylinder arrangement, holding the rollers 18 upon the rails 16. This is accomplished by locating the pivot 14 above the pivot between the pneumatic or hydraulic arrangement and the traverse 16 and operating the latter arrangement to exert a thrust upon the rods 6.

As previously described, the compensating arrangement comprises a dust tube 20 which extends into the bellows 12, the region between the bellows and the dust tube being filled by a heat-resistant elastic thermal insulation. An insulation of this type may consist of a packing of asbestos fibers in a heat resistant elastomer (e.g. polytetrafluoroethylene). An outlet 22 for collecting dust is provided between the stripper 11 and the housing 7 along the pipe 30 and leads back into the chute 7b.

We claim:

1. A device for discharging material from a column thereof above a support table, comprising:
    a discharge plate reciprocable on said table for alternately entraining said material in one direction and in the opposite direction;
    a housing enclosing said plate and the bottom of said column;
    a pair of tension rods fixed to said plate and extending at one side thereof out of said housing parallel to the reciprocating movement of said plate;
    a respective packing body slidable receiving each rod and spaced from said housing;
    means floatingly mounting said packing bodies on said housing for at least limited relative displacement of said packing body and said housing and motion-limiting means for restricting displacement of each packing body relative to said housing beyond a predetermined degree
    actuating means connected to said rod beyond said packing body for shifting said plate, said actuation means including a traverse connecting said rods beyond said packing bodies and a piston-and-cylinder arrangement pivotally connected to said traverse for displacing same;
    means forming a substantially horizontal guide surface, said traverse being provided with rollers riding upon said surface;
    and compensating means including a bellows affixed to said packing body, a dust tube extending into the bellows, and an elastically deformable insulation filling space between said dust tube.

2. A device for discharging material from a column thereof above a support table, comprising:
    a discharge plate reciprocable on said table for alternately entraining said material in one direction and in the opposite direction;
    a housing enclosing said plate and the bottom of said column;
    A pair of tension rods fixed to said plate and extending at one side thereof out of said housing parallel to the reciprocating movement of said plate;
    a respective packing body slidable receiving each rod and spaced from said housing;
    means floatingly mounting said packing bodies on said housing for at least limited relative displacement of said packing body and said housing and motion-limiting means for restricting displacement of each packing body relative to said housing beyond a predetermined degree;
    actuating means connected to said rod beyond said packing body for shifting said plate, said actuating means including a traverse connecting said rods beyond said packing bodies and a piston-and-cylinder arrangement pivotally connected to said traverse for displacing same; and
    means forming a substantially horizontal guide surface, said traverse being provided with rollers riding upon said surface,
    each of said bodies comprising a packing sleeve surrounding the respective rods, a dust stripper received in said sleeve and engaging the periphery of the respective rod at an end of the sleeve proximal to said housing, a plurality of packing rings received in said sleeve, and a packing boss bearing axially on said packing rings and connected to said sleeve.

3. The device defined in claim 2 wherein said means flexibly connecting said packing body to said housing includes a tube rigid with said each packing body and surrounding the respective rod while extending from said packing body toward said housing, a respective bellows formed on an end of said first tube proximal to said housing, and a dust tube extending axially into said first tube around the respective rod and anchored to said housing.

4. The device defined in claim 3 further comprising a body of elastic entrained insulation filling space between each bellows and the respective dust tube.

5. The device defined in claim 4 wherein said piston-and-cylinder means is disposed to provide a force component upon said traverse urging said rollers into engagement with said guide surface.

6. The device defined in claim 5, further comprising duct means connected with the interior of said first tube for leading dust therefrom.

* * * * *